June 6, 1950

R. L. MALCOLM 2,510,592

SYSTEM AND METHOD OF COMPENSATING FOR
FILM CHARACTERISTICS IN PHOTOGRAPHIC
SOUND RECORDING

Filed Nov. 18, 1946

Robert L. Malcom
INVENTOR.

BY
ATTORNEY

Patented June 6, 1950

2,510,592

UNITED STATES PATENT OFFICE 2,510,592

SYSTEM AND METHOD OF COMPENSATING FOR FILM CHARACTERISTICS IN PHOTOGRAPHIC SOUND RECORDING

Robert L. Malcom, Indianapolis, Ind., assignor to Radio Corporation of America, a corporation of Delaware Application November 18, 1946, Serial No. 710,431

13 Claims. (Cl. 179—100.3)

This invention relates to photographic sound recording systems, and particularly to a feedback system which compensates for the non-linearity of the exposure-transmission characteristic of a photographic emulsion.

Feedback systems for the elimination of distortion due to non-linearity of a modulating element, such as a galvanometer, are well-known, as evidenced by Wolfe U. S. Patent No. 2,270,367 of January 20, 1942, Singer U. S. Patent No. 2,292,166 of August 4, 1942, and Albin U. S. Patent No. 2,357,623 of September 5, 1944. Another patent pertinent to the present invention is Blaney U. S. Patent No. 2,361,451 of October 31, 1944, which discloses and claims a method of and system for controlling the exposure of a film in accordance with the emulsion characteristic of the film.

The present invention is directed to a system of compensating for the non-linearity of the film emulsion by the use of a control film having a density or transmission variation in accordance with a control film actually made on the recording system in which it is to be subsequently used. In this manner, a particularly accurate compensation can be achieved, and the linear recording range extended between more widely separated limits.

It is well-known that the negative exposure-positive transmission characteristic of a photographic emulsion has a central linear portion and curved end portions. As long as the exposure varies between the limits of the linear portion of a characteristic, true fidelity is obtained; but, when the exposure exceeds these limits, distortion is introduced, since the transmission does not vary linearly in accordance with the exposure. By varying the exposure over the curved portion of the characteristic to compensate for the departure from linearity in accordance with the amplitude of the signal, the final sound record will faithfully correspond to the original signal.

The principal object of the invention, therefore, is to facilitate the recording of photographic sound records.

Another object of the invention is to provide an improved method of and means for recording photographic sound records.

A further object of the invention is to provide an improved method of and means for producing a sound record having linearity over a wider range than normal.

A still further object of the invention is to provide a feedback system for a photographic recording system in which a control film is used to provide compensation for the non-linearity of the film emulsion.

A still further object of the invention is to provide a feedback system for a photographic recording system in which a compensatory control film is produced by the recording system for use in the feedback system.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
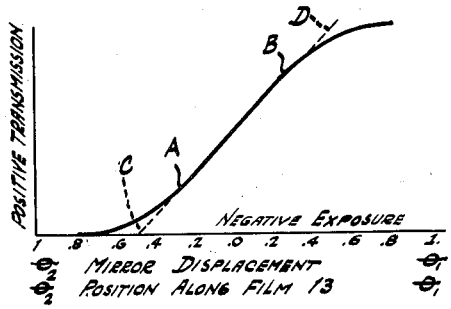
Fig. 1 is a graph of a composite characteristic between positive transmission and negative exposure, mirror displacement, and control film density.

Referring now to Fig. 1, the solid line curve represents an exposure-transmission characteristic having a linear portion between points A and B and toe and shoulder curved portions. It is well-known that as long as the exposure is between the points A and B, the light transmitted through the film will be directly proportional to the exposure; but, when the exposure is less than at point A or greater than at point B, there will be a non-linear proportionality, as illustrated. The present invention is adapted to approach very closely the condition wherein the straight portion A—B is extended, as shown by the dotted lines, to permit undistorted operation over the range of negative exposures between C and D. Although the portion A—B may not be absolutely rectilinear, it may be considered as such for purposes of explanation, the invention, however, correcting for any departure from rectilinearity regardless of its position on the characteristic.

The same curve may be translated into terms of positive transmission and galvanometer mirror displacement when such a modulating element is used, $\theta_1$ representing the maximum angular displacement of the mirror in the direction indicated by the positive values of the signal current, and $\theta_2$, the maximum displacement in the negative direction. The curve also shows the variation of the transmission through the control film made in accordance with the invention with displacements of the galvanometer mirror as will be explained hereinafter.

Figure 2:
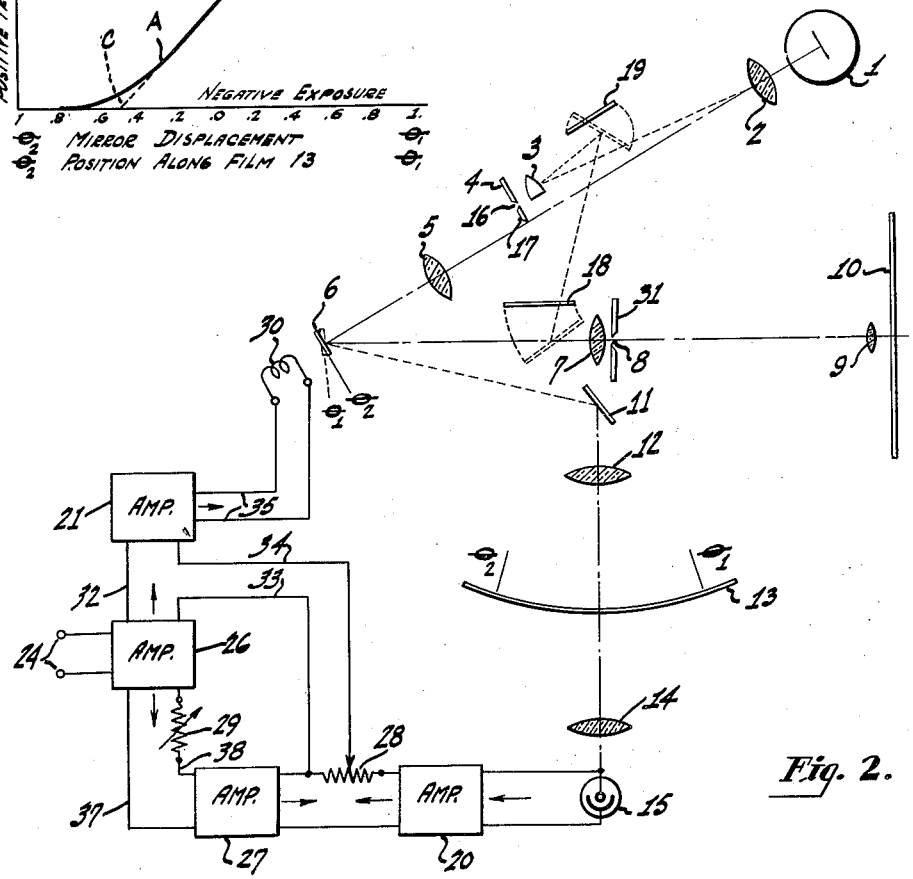
Fig. 2 is a diagrammatic view of a photographic recording and feedback system embodying the invention.

Referring now to Fig. 2, 1 is a light source having a straight filament, the light therefrom being collected by a lens 2 and projected onto a galvanometer mirror 6 by a lens 5. Intermediate the lenses 2 and 5 is a mask 4 having an aperture 16 therein and an edge 17 for forming a penumbra of uniform intensity gradient. A lens 3 is so positioned as to aid in getting a sharp image of slit 16, but does not appear in the line of light contributing to the penumbra produced by the edge 17.

Light, passing the edge 17 and from the mirror 6 which is vibrated by a galvanometer 30, is reflected to a lens 7 in front of a slit mask 31 having a slit 8 therein. Light emerging through the slit 8 is projected by a lens 9 onto the sound track portion of a film 10. By the dotted lines of the mirror 6, the limiting excursions of the mirror 6 are represented between positions $\theta_1$ and $\theta_2$, as shown in Fig. 1.

Light through the aperture 16 is reflected by the mirror 6 to a stationary mirror 11 where it is reflected through a lens 12 to a curved surface 13, which, during recording, is a control film. Shown at 18 and 19, are two mirrors, which, when rotated to the positions shown by the dotted lines, reflect the penumbra shadow back through aperture 16 which is then reflected by the mirror 6 to the mirror 11 and through lens 12 to curved surface 13, the points $\theta_1$ and $\theta_2$ representing the maximum excursion limits of the mirror, as shown in Fig. 1. When the mirrors are in their dotted line positions, the control film for use during recording is exposed in its preparation.

To produce the control strip 13, a strip of unexposed negative stock is exposed so that from position $\theta_1$ to $\theta_2$ there is a uniform exposure gradient. This strip is then developed and a positive strip printed from it. The positive strip is then placed accurately along the surface 13 so as to maintain the original register of exposure. To expose the original negative, the mirror 6 is uniformly moved between its two extreme positions $\theta_1$ and $\theta_2$. The mirrors 18 and 19 are then returned to their normal operating positions, shown by the solid lines. The positive strip developed from the negative is then placed at 13, the slit 16 being sharply focused thereon. The recording system is now ready for use in conjunction with the remainder of the system which will now be described.

Light, emerging through the positive strip 13, is projected by lens 14 onto the photoelectric cell 15 connected to an amplifier 20 having low phase distortion. The input signal to the galvanometer 30 arrives at terminals 24 from any suitable signal generating device, such as a microphone or a sound reproducer, the signal being impressed upon an amplifier 26. Amplifier 26 has one output over conductors 32, 33, and 34 to amplifier 21 which is connected over conductors 35 to the galvanometer 30, and a second output over conductors 37 and 38 to amplifier 27, conductors 37 and 38 having a resistor or potentiometer 29 therein for controlling the amplitude of the signal impressed upon amplifier 27. That is, the attenuator 29 is so adjusted that the output of amplifier 27 balances, or is equal to, the output of amplifier 20 when the image of slit 16 is in focus on the linear portion of the control strip 13. Inserted between the output of amplifier 27 and the output of amplifier 20 is an impedance 28 which is adjustable for varying the voltage impressed upon amplifier 21 in addition to that from amplifier 26. The output current from amplifier 27 is of such polarity or phase that it augments the output current from amplifier 26, while the output currents from amplifier 20 are phased to oppose the output currents from amplifier 26.

In normal operation of the system just described, the penumbra is vibrated across the slit 8 by the mirror 6 in accordance with the amplitude and frequency of a signal impressed upon the galvanometer 30, while the light through the aperture 16 is impressed upon the control film 13 for impression on the photoelectric cell 15 in accordance with the amplitude and frequency of the signal. When, at certain input signal levels, galvanometer mirror 6 produces an exposure on negative film 10 within the linear range, the image of slit 16 is also at a corresponding position of linearity along control strip 13. Over this range, the output from amplifier 20 is balanced by the output from amplifier 27, and no control potential is developed across impedance 28. This range is between A and B on the curve in Fig. 1.

At another value of input signal and corresponding angular displacement of the galvanometer mirror, the resulting effective exposure at negative 10 may be such that it fails to reach the condition of linear opacity after development of the negative. Thus, while a perfectly linear emulsion system would give linear positive transmission for linear exposure, the emulsion being considered will be assumed to give less than the requisite transmission through its positive. At this position of mirror 6, the image of slit 16 is at a position of corresponding non-linearity along the surface of control strip 13, resulting in an output current from amplifier 20 that is less than that from amplifier 27. Due to this lack of balance, there is developed across impedance 28, a current that augments the output from amplifier 26. The output from amplifier 21 being thus increased, the galvanometer tends to assume a position providing more illumination for the exposure of negative 10. When mirror 6 has advanced to a position whereby the image of slit 16 has reached such a point along control strip 13 that balance tends to be restored in impedance 28, the feedback potential tends to cease increasing.

When the exposure of film 10 occurs in a region where the positive transmission is greater than that indicated by linear conditions, the output of amplifier 20 exceeds that of amplifier 27 and the unbalance potential developed across impedance 28 tends to oppose the input to amplifier 21, thereby resulting in a tendency for the illumination of exposure to be reduced.

By proper selection of the amount of feedback current derived from impedance 28, it is possible to approach, at will, the condition of overall negative exposure-positive transmission characteristic with any type of emulsion ordinarily used. This is because the controlled strip 13 may be made with the recording system just described and thereafter used therein. By making the dimensions of the control film 13 and the image of slit 16 very large with respect to the average grain size, ground noise will be minimized.

Figures 3, 4, 5:
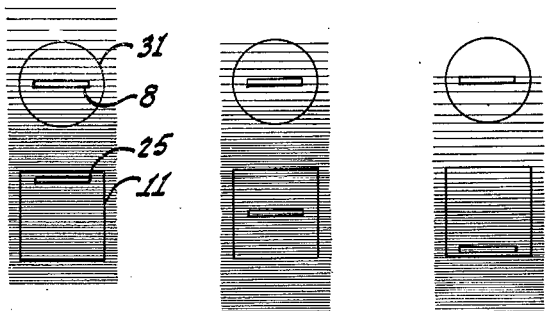
Fig. 3, Fig. 4, and Fig. 5 are diagrams illustrating the relative positions of the light beam with respect to the recording slit mask and control beam mirror.

In Figs. 3, 4, and 5, three positions of the penumbra shadow, shown graduated from light at the top to dark at the bottom, are shown impressed in three positions on the slit 8 and the mirror 11 together with an image 25 of the aperture 16 thereon. As the mirror 6 vibrates throughout its excursion, the penumbra will travel across the slit 8, while the image of aperture 16 will move across the mirror 11. Therefore, regardless of whether a high or low intensity light is being passed by the slit 8, a constant intensity light image 25 is being projected on the control film strip 13 which is modified in intensity by the density of the film control strip, as shown in Fig. 1, which corresponds to the emulsion characteristic of the original film.

The system may also be used in push-pull class B variable density systems by using two directionally opposed and laterally displaced penumbra and light slit channels. Properly adjusted, this system and method of feedback also tends to reduce distortion effects introduced at any point in the feedback loop, such as amplifier 21 and galvanometer 30, the latter including reflected mechanical properties. To provide the least possible delay distortion at all frequencies in the range being recorded, high frequency carrier currents may be used and all gain be effected by wide band amplification at these high frequencies, with power detectors forming the output circuits to the various loads.

Should it be economically desirable to accomplish dynamic control of film exposure with less equipment than that already described, the electrical portions of this system may be simplified considerably and satisfactory operational stability may be retained by applying the amplified current from the photoelectric cell as a degeneration factor directly into the amplifier channel that drives the galvanometer. This eliminates the balancing arrangement. In this event, it is only necessary to consider the exposure characteristics of the film emulsions used, together with the conditions of feedback, and to compute the variable manner in which the progressive exposure characteristic shall proceed along the length of the control strip negative. Alternatively, the control strip may be computed and laid out as a variable area mask so that various lengths of the image of the control light slit are presented to the condenser lens-photoelectric cell combination. When this is done, there is the advantage that this element of the system, namely, the control strip, introduces no background noise.

It is also possible to obtain the compensation current from a separate system using a galvanometer as nearly identical as possible to the one in the actual recording channel, thus providing conversion apparatus for existing systems. This auxiliary galvanometer would, of course, be actuated by amplified signal current obtained ahead of that point in the circuit at which degeneration is introduced.

I claim:

1. A sound recording system comprising a source of light, means for forming said light into a beam having a uniformly varying intensity gradient, a slit mask having a slit therein, means for vibrating said light beam across said slit, a film having an emulsion thereon, said emulsion having a non-linear exposure-transmission characteristic, a second film having a density variation varying in accordance with the exposure-transmission characteristic of said emulsion, means for forming said light into a second beam having a uniform intensity throughout its cross-sectional area, said vibrating means vibrating said second beam over said second film, and a feedback circuit adapted to vary said vibrating means in accordance with the variation in density of said second film to compensate for the non-linear characteristic of said emulsion, said circuit including a detector of said second beam and a connection to said vibrating means.

2. A sound recording system comprising a source of light, means for forming said light into two beams, one of said beams having a uniformly varying intensity gradient, and the other of said beams being of constant intensity, a film emulsion having a non-linear exposure-transmission characteristic, means having a variation in density corresponding to said exposure-transmission characteristic, and means for simultaneously vibrating both of said beams, said varying intensity beam being impressed upon said film emulsion in accordance with the amplitude and frequency of a signal being recorded, and said beam of constant intensity being vibrated over said means having a density varying in accordance with the exposure-transmission characteristic of said emulsion.

3. A sound recording system in accordance with claim 2, in which a detecting means for light passing through said means having a density varying in accordance with the exposure-transmission characteristic of said emulsion is provided together with a feedback system between said detecting means and said vibrating means for varying the portion of said varying intensity beam impressed on said emulsion in accordance with the variations in density of said varying density means.

4. A sound recording system in accordance with claim 2, in which a feedback circuit is provided between said constant intensity beam and said vibrating means for varying the actuation of said vibrating means in accordance with the position of said constant intensity light beam on said variable density means, said circuit including a light-to-current translator for detecting variations in intensity of said beam.

5. The method of sound recording comprising generating a light beam of uniformly varying intensity gradient and a light beam of constant cross-section and constant intensity, simultaneously vibrating said beams, impressing said beam of varying intensity on a light sensitive emulsion in accordance with the amplitude and frequency of a signal being recorded, and varying the impression of said beam on said emulsion in accordance with the position of said constant intensity beam.

6. The method of compensating for the non-linearity of the exposure-transmission characteristic of a film emulsion during recording comprising producing two light beams, one of said beams having a uniformly varying intensity gradient, and the other of said beams having a constant intensity, impressing portions of said beam of varying intensity on a film emulsion in accordance with the amplitude and frequency of a signal being recorded, and simultaneously varying the position of said constant intensity beam over a surface varying in light transmission in accordance with the variation in the exposure-transmission characteristic of said emulsion.

7. The method in accordance with claim 6 which includes generating a current from said constant intensity beam as modified by transmission through said surface for varying the position of said varying intensity beam.

8. The method in accordance with claim 6 which includes generating a current from said constant intensity beam as modified by transmission through said surface and utilizing said current for modifying the impression of said varying intensity beam on said emulsion.

9. The method of compensating for the non-linearity of the exposure-transmission characteristic of a film emulsion during recording comprising generating two light beams, one of said beams having a uniformly varying intensity gradient, and the other of said beams being of constant size and intensity, projecting portions of said varying intensity beam to a film emulsion having a non-linear exposure-transmission characteristic, the portion of said beam being projected at any instant depending upon the amplitude of the signal being recorded, varying the intensity of said constant intensity beam in accordance with the portion of the varying intensity beam being impressed upon said emulsion, and controlling the portion of said variable intensity beam impressed on said emulsion by the variations in said constant intensity beam.

10. The method in accordance with claim 9, in which said last mentioned controlling supplements the variation of said variable intensity beam by the amplitude of said signal.

11. A sound recording system comprising a light source, means for forming a plurality of light beams from said source, one of said beams having a uniformly varying intensity gradient, and the other of said beams having a constant size and intensity, means for simultaneously vibrating said beams, a first film, said vibrating means being adapted to impress different portions of said varying intensity beam on said film, a second film, means for projecting said constant intensity beam to said second film, and means for eliminating said varying intensity beam from said first film and projecting it to said second film instead of said constant intensity beam.

12. A system in accordance with claim 11, in which said vibrating means is a galvanometer mirror and said last mentioned means comprises light deflectors, one of which is positioned in the path of said variable intensity beam after deflection by said mirror.

13. A system in accordance with claim 11, in which said last mentioned means includes a light deflector deflecting said varying intensity beam from said vibrating means and a deflector intermediate said light source and said beam forming means for further deflecting said varying intensity beam.

ROBERT L. MALCOM.

REFERENCES CITED

The following references are of record in the file of this patent:

UNITED STATES PATENTS

| Number | Name | Date |
|---|---|---|
| 2,105,769 | Hansen | Jan. 18, 1938 |
| 2,198,798 | Albershein | Apr. 30, 1940 |
| 2,268,097 | Underhill | Dec. 30, 1941 |
| 2,286,729 | Hall | June 16, 1942 |
| 2,292,166 | Singer | Aug. 4, 1942 |
| 2,357,623 | Albin | Sept. 5, 1944 |
| 2,361,451 | Blaney | Oct. 31, 1944 |
| 2,376,567 | Albin | May 22, 1945 |